(12) United States Patent
Schümann et al.

(10) Patent No.: US 7,112,371 B2
(45) Date of Patent: Sep. 26, 2006

(54) SURFACE PROTECTING FILM FOR PAINTED SURFACES, COMPRISING POLYURETHANE-BASED PRESSURE-SENSITIVE COMPOSITION

(75) Inventors: Uwe Schümann, Pinnenberg (DE); Nicolai Böhm, Hamburg (DE); Ulrike Wappler, Hamburg (DE); Ingolf Schütz, Hamburg (DE); Johannes Steinforth, Bliedersdorf (DE); Jobst-Waldemar Klemp, Schonefeld (DE); Ingo Neubert, Norderstedt (DE); Bernhard Müssig, Seevetal (DE)

(73) Assignee: TESA AG, Hamburg (DE)

(*) Notice: Subject to any disclaimer, the term of this patent is extended or adjusted under 35 U.S.C. 154(b) by 0 days.

(21) Appl. No.: 10/311,296

(22) PCT Filed: May 25, 2001

(86) PCT No.: PCT/EP01/05986

§ 371 (c)(1),
(2), (4) Date: Jun. 30, 2003

(87) PCT Pub. No.: WO01/96489

PCT Pub. Date: Dec. 20, 2001

(65) Prior Publication Data

US 2004/0038040 A1    Feb. 26, 2004

(30) Foreign Application Priority Data

Jun. 15, 2000 (DE) .................. 100 29 489

(51) Int. Cl.
*B32B 27/40* (2006.01)
(52) U.S. Cl. .................. 428/423.3; 428/423.1; 428/343; 428/355 N
(58) Field of Classification Search ......... 428/423.1, 428/343, 355 N
See application file for complete search history.

(56) References Cited

U.S. PATENT DOCUMENTS

| | | | |
|---|---|---|---|
| 2,463,452 A | 3/1949 | Yule | 260/31.8 |
| 4,131,114 A * | 12/1978 | Kirkpatrick et al. | 602/8 |
| 4,151,319 A | 4/1979 | Sackoff et al. | 428/40 |
| 4,460,364 A | 7/1984 | Chen et al. | 604/387 |
| 5,895,714 A | 4/1999 | Malek | 428/337 |
| 5,939,341 A * | 8/1999 | Brown et al. | 442/351 |
| 6,027,465 A * | 2/2000 | Scholz et al. | 602/6 |
| 6,040,028 A | 3/2000 | Cline et al. | 428/41.8 |
| 6,319,353 B1 | 11/2001 | Müssig | 156/334 |
| 2001/0004494 A1 | 6/2001 | Müssig | 428/343 |

FOREIGN PATENT DOCUMENTS

| | | |
|---|---|---|
| DE | 294057 A * | 9/1991 |
| EP | 0 519 278 A2 | 12/1992 |
| EP | 0 761 315 A2 | 3/1997 |
| EP | 0 763 584 A1 | 3/1997 |
| EP | 0 826 542 A2 | 3/1998 |
| EP | 0 905 209 A1 | 3/1999 |
| JP | 61281163 | 12/1986 |
| JP | 3221169 | 9/1991 |
| JP | 6073352 | 3/1994 |
| JP | 9-165559 | 6/1997 |
| JP | 9-194807 | 7/1997 |
| JP | 11-124551 | 5/1999 |
| JP | 11-236539 | 8/1999 |
| WO | WO 96/37568 | 11/1996 |

OTHER PUBLICATIONS

Abstract of JP 3221169 from EPO website database.
Abstract of JP 61281163 from EPO website database.
Abstract of EP 0519278 (JP 6073352) from EPO website database.
Patent Abstract of Japan for JP publication No. 01275687.

* cited by examiner

*Primary Examiner*—James J. Seidleck
*Assistant Examiner*—Saira Raza
(74) *Attorney, Agent, or Firm*—Norris McLaughlin & Marcus P.A.

(57) ABSTRACT

A self-adhesive surface protective film, particularly for automobile paint surfaces, having a backing layer and a self-adhesive layer based on a crosslinked polyurethane, characterized in that the loss angle tan δ of the polyurethane at room temperature in the frequency interval from $10^{-1}$ to $10^{2}$ rad/sec rises or remains at the same level.

11 Claims, No Drawings

SURFACE PROTECTING FILM FOR PAINTED SURFACES, COMPRISING POLYURETHANE-BASED PRESSURE-SENSITIVE COMPOSITION

This application is a 371 of PCT/EP01/05986, filed on May 25, 2001.

The invention relates to a surface protective film whose great weathering stability and secure adhesion make it especially suitable for the temporary protection of fresh automobile paint surfaces against soiling and damage but also for other sensitive surfaces such as metals, plastics, and glazing.

The preservation and protection of motor vehicles in transit from manufacturer to dealer has long been common practice.

The conventional method of preserving automobiles is by applying paraffin waxes or acrylate waxes in a thickness of from 5 to 20 μm. However, it has been found that, especially on horizontal areas of the vehicles, such as hood, roof, and trunk lid, such a thin and usually nonuniform coat does not afford adequate protection against external influences, such as the corrosive effect of bird droppings, for example.

A considerable disadvantage of sealing with paraffin wax is the need to remove the preservative using a steam jet, surfactants or solvents. Environmentally sound recovery and disposal of the residues entail considerable deployment of apparatus and also very high costs.

A current development in the field of automobile transit protection is the use of covers which go over the entire vehicle and are shrunk on to fit by exposure to heat. Cover solutions of this kind are very costly and involve a great deal of effort in applying the cover, effecting shrinkage, and especially for entry to the masked vehicle. For that particular purpose, zipper openings are provided, whose necessary opening and reclosing is time-consuming. Visibility when maneuvering a motor vehicle enveloped with a cover is severely impaired, and enclosed dirt and unavoidable scuffing result in scratches on the paint in certain areas.

In recent years, instead, increased use has been made of self-adhesive surface protective films which are applied temporarily. They are specifically intended for mechanical and chemical protection of fresh motor vehicle finishes, have a much better protective effect than the waxes, and have the advantage over the covers of being more favorably priced and much quicker to apply.

An essential requirement of a surface protective film is its weathering stability over a period of more than six months. Accordingly, even after six months of intense sunlight exposure, a film of this kind must be removable in one piece and must not leave any residues of adhesive on the paint. Moreover, it must possess a sufficient initial tack, so as not to detach of itself prematurely in situations of difficult bonding geometry, but at the same time must not have too great an ultimate bond strength on paint, so that the film can be removed without substantial force being applied and certainly without tearing.

In accordance with the prior art, therefore, film materials used are generally polyolefins or mixtures thereof which are commonly blended with light stabilizers and titanium dioxide.

A diversity of systems are used as self-adhesive compositions, but without exception are hampered by weaknesses.

Self-adhesive compositions based on natural rubber possess relatively good initial adhesion. Even on short-term exposure to UV radiation, however, these compositions are not stable to aging. Following realistic weathering exposures over a period of several months, this leads to severe greasy residues or hardened paintlike residues on the finish.

U.S. Pat. No. 5,612,136 mentions a protective film having an acrylate-based self-adhesive composition. Polyacrylate compositions are indeed highly UV-stable. If, however, uncrosslinked polyacrylate compositions are stored under alternating climatic conditions, their compatibility with paint surfaces is good only in some cases. Compatibility means that the paint surface shows no deformation whatsoever after the adhesive tape has been removed.

Deformations are visually perceptible, irreversible changes to the paint surface which come about if the fresh paint, not yet fully cured, is covered with an unsuitable protective film. There are two effects that may be observed:
  impressions of the protective film in the region of the bond edges or on fold areas;
  dulling of the paint over the entire bond area by a rough surface of the adhesive composition.

Moreover, polyacrylate compositions exhibit an undesirable extent of peel increase. The skilled worker understands the term "peel increase" as the increase in bond strength which occurs on storage of the bonded assembly. Where these compositions are strongly crosslinked chemically or by radiation, they are indeed easier to remove but on the other hand cause increased incidence of clearly visible, permanent deformations of the paint surface.

Self-adhesive compositions based on polyisobutylene (polyisobutylene homopolymer or butyl rubber) exhibit little adhesion to finishes customary in the automobile industry following storage under alternating climatic conditions. Under jerky stresses, such as on flapping in the slipstream, the adhesion is so low that the bond strength required in the art is not always present to a sufficient extent. Under the influence of moisture, in particular, the adhesion is often reduced to such an extent that the film detaches from the protected vehicles in transit, resulting firstly in a loss of protection and secondly in a safety risk if the film drifts uncontrolledly onto the windshield of following vehicles.

Moreover, polyisobutylene-based self-adhesive compositions are not very cohesive and therefore produce residues of adhesive composition when the film is removed, particularly in the edge region after UV aging. Moreover, this self-adhesive composition is incompatible with the sealing profiles that are customary in automobile construction, or with the plasticizers they contain. When the protective film is removed from window profiles, residues of the adhesive remain on the rubber. Adhesive articles of this kind are described in EP 0 519 278, JP 95-325285, and U.S. Pat. No. 5,601,917.

Substantially more UV-stable than polyisobutylenes are adhesives comprising hydrogenated styrene/diene block copolymers, whose application is described in JP 08 027 444. A major disadvantage of such block copolymers is their thermally reversible crosslinking by way of the styrene domains. If an adhesive film produced from them is removed in summer from a vehicle which has become hot in the sun, the adhesive remains to a large extent adhering to the paint, since the cohesion of adhesives is lower than the adhesion to the paint. Heating always leads to shrinkage of the protective film, and the warmed, soft adhesive therefore leaves residues on the receding edges of the adhesive film on the metal panel.

The adhesive film described in DE 195 32 220, comprising EVAc adhesive, is significantly superior in adhesion to the systems described above. When removed after use, however, the bond strength of this adhesive film is much too high, and so it can only be removed by expending a relatively high level of force. This increase in bond strength on storage of the bonded assembly is referred to by the skilled worker as "peel increase". At high temperatures of 90° C., for example, which are attained on the surfaces of vehicles in the summer, this effect is manifested to a particular extent.

WO 96/37568 describes the use of polyhexene and, respectively, polyoctene for a nonpolar pressure-sensitive adhesive (PSA). Although the peel increase of the polymers described in the examples is low, the low molecular weight of commercial polymers of this kind nevertheless means that these polymers, too, lead to residues, which it is attempted to avoid by adding other polymers, referred to therein as "cold flow restricting agents". For practical purposes, nevertheless, these adhesives lack adequate cohesion, which leads to residues after weathering, especially if the adhesive tape shrinks on exposure to heat.

A similar phenomenon is displayed by ethylene-propylene-diene copolymers (EPDM), as specified in DE 197 42 805, and also by olefin-based terpolymers as in DE 197 30 193. Both polymers, furthermore, exhibit extremely low tack (immediate adhesion), resulting in processing problems or long press-on times in practice, especially in areas of high curvature.

U.S. Pat. No. 5,972,453 describes a removable adhesive film for the windows of motor vehicles, the polyurethane-based adhesive of which film achieves a maximum bond strength of 0.2 N/cm on glass. Such low bond strength is too little for application as a transit protective film for automobile paint surfaces. Moreover, no indications are given as to whether such a film is suitable for automobile paint surfaces in respect of paint deformations, or as to how, if appropriate, the polyurethane adhesive must be formulated.

It is an object of the invention to provide a surface protective film, especially for fresh automobile finishes, which does not have (or not to the same extent) the above-described disadvantages of the prior art. In particular, the surface protective film is to possess not only an initial bond strength which is appropriate for transit of the vehicle but also a balanced ultimate bond strength which allows the film to be removed easily after use, and to have extraordinarily good weathering stability, freedom from residues on removal, and good paint compatibility. Paint compatibility means that there must be no paint deformations arising through the use of the film.

This object is achieved by means of a surface protective film as specified in the main claim. The subclaims relate to advantageous developments of the surface protective film.

The invention accordingly relates to the structure and production of a self-adhesive, surface protective film, comprising a backing layer and a self-adhesive layer based on a crosslinked polyurethane, the loss angle tan δ of the polyurethane at room temperature rises in the frequency interval from $10^{-1}$ to $10^2$ rad/sec or remains at the same level.

In one preferred embodiment of the invention, the backing layer of the adhesive is a thermoplastic polyolefin sheet which ought to include at least one polyolefin from the group of the polyethylenes (for example, HDPE, LDPE, MDPE, LLDPE, VLLDPE, copolymers of ethylene with polar comonomers) and from the group of the polypropylenes (for example, polypropylene homopolymers, random polypropylene copolymers or block polypropylene copolymers). It is preferred to use mixtures of different suitable polyolefins, in order to allow optimum setting of the mechanical and thermal properties and also gloss, extrusion properties, anchoring of the adhesive, etc.

A thickness of from 20 to 80 μm is preferred for the backing sheets. During the application of the protective film, the softness of the backing sheet has a part to play in connection with the deformability; the force at 10% elongation should not exceed 25 N/15 mm, preferably 16 N/15 mm, in either the lengthwise or transverse direction (tensile test in accordance with DIN 53455-7-5). For this reason it is advantageous if the backing sheets are unoriented. Orientation raises the force at 10% elongation so greatly that conformability is no longer assured.

In order to give the backing sheet the required weathering and light stability, the addition of light stabilizers and UV stabilizers is advisable, in accordance with a further outstanding embodiment of the invention. Their function consists primarily in preventing the embrittlement or yellowing of the backing sheet.

The amount of light stabilizer and/or UV stabilizer ought to be at least 0.15% by weight, preferably at least 0.30% by weight, based on the backing sheet.

Light stabilizers of this kind are described in Gaechter and Mëller, Taschenbuch der Kunststoff-Additive, Munich 1979; in Kirk-Othmer (3rd) 23, 615–627; in Encycl. Polym. Sci. Technol. 14, 125–148; and in Ullmann (4th) 8, 21; 15, 529, 676. Hindered amine light stabilizers (HALS) in particular, such as dimethyl succinate polymer with 4-hydroxy-2,2,6,6-tetramethyl-1-piperidineethanol (CAS No. 65447-77-0), bis(2,2,6,6-tetramethyl-4-piperidyl) sebacate (CAS No. 52829-07-9) or poly[[6-[(1,1,3,3-tetramethylbutyl)amino]-1,3,5-triazine-2,4-diyl]][(2,2,6,6-tetramethyl-4-piperidyl) imino]hexamethylene-[(2,2,6,6-tetramethyl-4-piperidyl) imino]] (CAS No. 70624-18-9), for example are suitable for the protective film of the invention.

The use of antioxidants for the sheet (for example, sterically hindered phenols (Irganox 1010) or trisnonylphenyl phosphite) is advantageous though not absolutely necessary. Further suitable UV absorbers, light stabilizers, and aging inhibitors are set out in EP 0 763 584.

An additional improvement in the light stability of the backing sheet is also possible through the addition of titanium dioxide. Of advantage in respect of the mechanical properties and the homogeneity of the whiteness are from 5 to 15% by weight additions of titanium dioxide.

The UV permeability of the protective film in the region from 290 to 360 nm is preferably less than 1%, more preferably less than 0.1%, owing to the interaction of light stabilizers and pigments.

The properties of the adhesive can be quantified readily by means of a Theological oscillation measurement. Here, the sample of the adhesive, present between two plane-parallel plates, is deformed sinusoidally with a circular frequency ω. If measurement is carried out in the region of low deformations, i.e., linear viscoelasticity, this measurement mode is virtually free of travel and makes it possible to investigate substances sensitive to shearing, viscoelastic liquids or solids without an irreversible change in the structure as a result of measurement. The sample transmits the stimulating oscillation to the force transducer with a shifting phase δ and with reduced amplitude. This gives a complex shear modulus G*, whose real component reflects the elastic component (storage modulus G') and whose imaginary component reflects the viscous component (loss modulus G"). The quotient formed from these two variables is tan δ, $$\tan \delta = G''/G'$$

If the stimulating frequency is varied (frequency sweep), tan δ is obtained as a function of frequency. With a small circular frequency, the deformation energy can still be predominantly dissipated in the case of viscoelastic liquids through sliding of the polymer chains. Toward higher circular frequencies the possibility for this is less and less, since the effort by the chains to slide no longer approaches the quick external movement. Instead, the energy introduced is increasingly stored. In the case of a viscoelastic solid, the permanent nodes prevent any possibility for dissipation over the entire frequency range.

Accordingly, tan δ displays a different characteristic course: tan δ falls in the case of viscoelastic liquids and rises in the case of viscoelastic solids. In the boundary region, tan δ is approximately constant. These two corner points of rheological properties are determined by the crosslinking density. Nodes can be produced by energetic interactions or intermeshing of the polymer chains (physical crosslinking) or by covalent chemical bonds (chemical crosslinking).

The pressure sensitive adhesive of the protective film of the invention is a crosslinked polyurethane layer. Crosslinking of the polyurethane layer in the sense of this invention is present when the nodal density of the pressure sensitive adhesive is sufficient to form a complete three-dimensional net structure which has the properties of a viscoelastic solid. The nodal points may be chemical or physical in nature. The rheological properties of such a substance are characterized in that in the frequency range between $10^{-1}$ and $10^2$ rad/sec at room temperature the loss angle tan δ rises or remains at the same level. If the nodal density is too low, owing to the choice of polyol and isocyanate components and their proportions by weight to one another, the substance takes on the properties of a viscoelastic liquid and for this application is not in accordance with the invention, since it then tends toward smearing and associated residues of adhesive, owing to lack of shear strength, especially at elevated temperatures. Rheologically, a physical characteristic of this kind is manifested in a descending course of the loss angle tan δ in the frequency range between $10^{-1}$ and $10^2$ rad/sec at room temperature.

In one preferred embodiment, aliphatic isocyanates are used for preparing the polyurethane layer. Suitable examples include isophorone diisocyanate, hexamethylene diisocyanate, dicyclohexylmethane 4,4'-diisocyanate, mixtures of said isocyanates, or isocyanates derived chemically therefrom, examples being dimerized, trimerized or polymerized types containing, for example, urea, uretdione or isocyanurate groups. It is, however, also possible to use aromatic isocyanates, such as tolylene diisocyanate or diphenylmethane 4,4'-diisocyanate, for example, or isocyanates which contain aromatic groups but in which the isocyanate groups themselves are attached to aliphatic moieties—an example is m-tetramethylxylene diisocyanate. As the isocyanate component it is also possible, furthermore, to use prepolymers; that is, reaction products of isocyanate and polyol prepared beforehand in an NCO/OH ratio of more than one.

In another preferred embodiment, the polyol component used comprises polypropylene glycols, polyethylene glycols, hydrogenated hydroxyl-functionalized polyisoprenes, hydroxyl-functionalized polyisobutylenes or hydroxyl-functionalized polyolefins. Also suitable are hydroxyl-functionalized polybutadienes and also other, hydrogenated and unhydrogenated, hydroxyl-functionalized hydrocarbons. Polytetramethylene glycol ethers (polytetrahydrofurans) are likewise suitable. Suitability is also possessed by polyesterpolyols and also by mixtures of the abovementioned polyol components. As polyol components it is likewise possible to use reaction products of isocyanate and polyol prepared beforehand in an NCO/OH ratio of less than 1. Known chain extenders, short-chain crosslinkers or terminators may likewise be used as well in forming the polyurethane layer.

In order to obtain an appropriate coating viscosity, the polyurethane components may also be diluted with solvents.

Besides the isocyanate components listed and the polyol components which react with them, it is also possible to use other reactants to form the polyurethane, without departing from the concept of the invention.

In order to accelerate the reaction between the isocyanate component and the component that reacts with the isocyanate, it is possible to use all catalysts known to the skilled worker, such as tertiary amines or organotin compounds, for example.

Polyurethanes as described above are prior art in their preparation and are described, for example, in Ullmann's Encyclopedia of Industrial Chemistry, Vol. A21: Polyurethanes.

In one possible embodiment, the polyurethane layer includes further formulating components, such as fillers, pigments, rheological additives, additives for improving adhesion, plasticizers, resins (tackifiers), elastomers, aging inhibitors (antioxidants), light stabilizers, UV absorbers, and other auxiliaries and additives, such as driers (for example, molecular sieve zeolites, calcium oxide), flow and leveling agents, wetting agents (surfactants) or catalysts, for example.

Fillers which can be used include all fine-ground solid additives such as for example, chalk, magnesium carbonate, zinc carbonate, kaolin, barium sulfate, titanium dioxide or calcium oxide. Further examples are talc, mica, silica, silicates or zinc oxide. Mixtures of these substances may also be used.

The pigments used may be organic or inorganic in nature. Examples are all kinds of organic or inorganic color pigments, especially white pigments such as titanium dioxide, for instance, for improving the light stability and UV stability, and also metal pigments.

Examples of Theological additives are pyrogenic silicas, phyllosilicates (bentonites), high molecular mass polyamide powders or castor oil derivative powders.

Additives for improving the adhesion may be, for example, substances from the groups of the polyamides, epoxides or silanes.

Examples of plasticizers are phthalates, trimellitates, phosphates, esters of adipic acid, and other acyclic dicarboxylic esters, fatty acid esters, hydroxycarboxylic esters, alkylsulfonic esters of phenol, aliphatic, cycloaliphatic, and aromatic mineral oils, hydrocarbons, liquid or semisolid rubbers (for example, nitrile rubbers or polyisoprene rubbers), liquid or semisolid polymers of butene and/or isobutene, acrylic esters, polyvinyl ethers, liquid resins and soft resins based on the raw materials which also constitute the basis for tackifier resins, lanolin and other waxes, silicones, and also polymer plasticizers such as polyesters or polyurethanes, for instance. Particularly suitable plasticizers are those which are stable to aging, without an olefinic double bond.

Suitable resins (tackifiers) are all natural and synthetic resins, such as rosin derivatives (for example, derivatives formed through disproportionation, hydrogenation or esterification), coumarone-indene resins and polyterpene resins, aliphatic or aromatic hydrocarbon resins (C-5, C-9, $(C-5)_2$ resins), mixed C-5/C-9 resins, fully and partly hydrogenated derivatives of the aforementioned types, resins comprising styrene or α-methylstyrene, and also terpene-phenolic resins and others as set out in Ullmanns Enzyklopädie der technischen Chemie, volume 12, pp. 525–555 (4th ed.), Weinheim.

Examples of suitable elastomers are EPDM rubber or EPM rubber, polyisobutylene, butyl rubber, ethylene vinyl acetate, hydrogenated block copolymers of dienes (for example, by hydrogenation of SBR, cSBR, BAN, NBR, SBS, SIS or JR, such polymers are known for example, as SEPS and SEBS) or acrylic copolymers such as ACM.

Suitable UV absorbers, light stabilizers, and aging inhibitors for the adhesive compositions are the same as those set out earlier on above for the stabilization of the sheet, and also secondary aromatic amines and derivatives of benzophenone.

The formulation of the polyurethanes with further components, such as fillers and plasticizers for example, is likewise prior art and is employed in particular in connection with the preparation of sealing compounds (cf. Ullmann's Encyclopedia of Industrial Chemistry, Vol. A 23: Sealing Materials).

In a further preferred embodiment, the polyurethane is formed using an NCO/OH ratio of from 0.6 to 1.2.

In one preferred embodiment, the thermoplastic polyolefin sheet is coated with the polyurethane by the process described hereinbelow:

A vessel A is charged substantially with the polyol constituent and a vessel B with substantially the isocyanate constituent, the further formulating components having already been mixed into these constituents in a customary mixing technique beforehand, where appropriate.

In a mixer of a two component mixing and metering unit, the polyol constituent and the isocyanate constituent are mixed.

The polyurethane composition thus mixed is applied to the polyolefin sheet which, is moving preferably at a constant speed. The polyolefin sheet coated with the polyurethane composition is guided through a heat tunnel in which the polyurethane composition cures. The application weight of the polyurethane composition is arbitrary; it is preferred to set application weights of between 1 and 100 g/m$^2$, with particular preference between 5 and 30 g/m$^2$.

Finally, the coated polyolefin sheet is wound up in a winding station.

The process described makes it possible to operate without solvent and to prepare crosslinked polyurethane PSA compositions in situ.

In order to improve the anchoring of the polyurethane composition on the polyolefin sheet, any known method of surface pretreatment may be used, such as corona pretreatment, flaming or gas phase treatment (fluorination, for example), for example. It is likewise possible to use any known method of priming, it being possible for the primer layer to be applied to the polyolefin sheet either from solution or dispersion or else in an extrusion or coextrusion process.

In order to improve the unwind properties of the wound roll, the reverse face of the polyolefin sheet may be precoated with a release lacquer or else may carry a coextruded or extruded-on reverse-face release coating.

A protective film in accordance with the above description, consisting essentially of a polyolefinic backing layer and a self-adhesive layer based on a crosslinked polyurethane, exhibits outstanding product properties owing to the crosslinked polyurethane self-adhesive layer, the like of which were unforeseeable even for the skilled worker.

The crosslinked PU self-adhesive compositions, characterized by the course of tan δ, first have very good adhesion to a variety of finishes common in the automobile industry, even under the influence of moisture or humid conditions, so that the protective film does not detach from the vehicle even under wind exposure or under tension caused by bonding to curved surfaces. Moreover, the self-adhesive composition exhibits sufficient bond strength within the first few minutes following application, so that after just half an hour, for example, the protective film may be exposed, for example, to a severe slipstream load (up to 160 km/h), but on the other hand may still be removed without employing high force, following prolonged use. Moreover, even without application of a release layer, the protective film of the invention has an unwind force which is sufficiently low for the user, despite the strongly adhering adhesive.

The bond strength of the protective film of the invention to 2K PU paints is generally more than 0.2 N/cm in the fresh state and below 5 N/cm following storage under alternating climatic conditions (in analogy to AFERA method 4001). Even exposure of the protective film to UV light—for example, Xenotest 150 in accordance with DIN 53387 1-A-X over 800 hours—does not cause any deficiencies in the properties of the protective film: there is no embrittlement of the film and there are no residues of adhesive composition on removal.

The protective film of the invention is therefore particularly suitable for assembly or transit protection of the fresh finish of automobiles or as processing and transit protection for freshly painted steel surfaces. The protective film may be bonded just half an hour after the painted surfaces have passed through the oven, without any disadvantages whatsoever, despite the fact that at this point in time the paint has not yet attained its end state. The compatibility of the protective film of the paint, i.e., the paint deformation behavior, is excellent, which is particularly surprising, as this requirement had up until now been met by uncrosslinked pressure sensitive adhesive compositions. A further feature of the protective film of the invention is that it can be applied in a large width over the hood, roof, and trunk of automobiles and that, owing to its deformability, it conforms very well to planar and even gently curved surfaces. It is therefore possible to protect the horizontal surfaces which are most at risk from soiling and mechanical damage. However, even narrow areas such as, for example, the projection of the door beneath the windows, or bumpers, can easily be covered. Protection of the vertical surfaces on the vehicle is particularly appropriate during its assembly.

The protective film is resistant to sunlight, moisture, heat, and cold, with weathering stability of at least six months. The addition of pigments such as titanium dioxide and of light stabilizers leads, in particular, to an improvement in the UV stability of the protective film. Even very high sun levels, as are encountered in Florida, for example, do not cause the protective film to fail or detach. The extremely low UV permeability of the protective film prevents the adhesive being broken down by sun exposure.

Furthermore, the strength of the protective film in comparison to preservation with wax ensures impeccable protection against soiling such as bird droppings and against damage to the vehicle as a whole by minor mechanical events. Following its use, the protective film can be removed without tearing of the backing sheet and without residue despite the good adhesion it necessarily possesses. It is possible to recycle the protective film or recover energy from it, in particular since it is halogen-free.

In the text below, the invention will be illustrated on the basis of examples which are not, however, intended to restrict the invention.

EXAMPLES

Coating in the examples was carried out on a laboratory coating unit from Pagendarm. The web width was 50 cm. The coating width was variably adjustable between 0 and 1 cm. The length of the heating tunnel was about 12 m. The temperature in the heating tunnel was divisible into four zones and was freely selectable in each case between room temperature and 120° C.

A two-component mixing and metering unit from Spritztechnik-EMC was used. The mixing system was dynamic. The mixing head was designed for two liquid components. The mixing rotor had a variable speed with a maximum of about 5000 rpm. The metering pumps of this unit were gear pumps having a maximum conveying output of approximately 2 l/min.

The A components were readied in an evacuable mixing vessel from Molteni.

Example 1

A 50 μm polyolefin film composed of 60 parts by weight PP homopolymer, 30 parts by weight LLDPE, 10 parts by weight titanium dioxide and 0.3 part by weight HALS stabilizer (Tinuvin 770) was produced by flat film extrusion in a width of 1450 mm and was subsequently cut to a width of 50 cm for polyurethane coating.

The film had the following physical properties:

| | | |
|---|---|---|
| Thickness | 50 μm | DIN 53370 |
| Weight | 48 g/m$^2$ | DIN 53365 |
| Tensile strength, longitudinal | 30 N/mm$^2$ | DIN 53455-7-5 |
| Force at 10% elongation, longitudinal | 19 N/15 mm | DIN 53455-7-5 |
| Tensile strength, transverse | 20 N/mm$^2$ | DIN 53455-7-5 |
| Elongation, longitudinal | 450% | DIN 53455-7-5 |
| Elongation, transverse | 450% | DIN 53455-7-5 |
| Tensile impact strength, longitudinal | 3000 mJ/mm$^2$ | DIN 53448 |
| Tensile impact strength, transverse | 200 mJ/mm$^2$ | DIN 53448 |

The film was corona pretreated and immediately thereafter was coated with a degassed, two-component, solvent-free polyurethane pressure-sensitive adhesive composition in a thickness of 15 μm using a bar coater. The coating speed was 20 m/min. Curing took place at a tunnel temperature of 80° C. The resulting protective film was edged and wound into rolls 200 m long and 50 cm wide.

The composition of the polyurethane pressure-sensitive adhesive was as follows:

| | Base material | Weight fraction [% by weight] |
|---|---|---|
| A component | Arcol 1030 ® | 2.0 |
| | Arcol 1074 ® | 89.5 |
| | Dibutyltin dilaurate | 0.3 |
| | Tinuvin 400 ® | 0.3 |
| | Tinuvin 292 ® | 0.2 |
| | Aerosil R202 ® | 1.0 |
| B component | Vestanat IPDI ® | 6.7 |

The loss angle tan δ of the PSA film at room temperature with a measuring frequency of $10^{-1}$ rad/s had a value of 0.02 which rose to 0.14 with a measuring frequency of $10^2$ rad/s.

The self-adhesive film produced in this way was readily unwindable, without creases, and could be applied flawlessly when used to protect automobiles. The effective tack and ready correctability enabled the bonding operations to be accelerated. Following service of up to six months' bonding with external weathering, the self-adhesive film was removable without defects.

The protective film was characterized by the physical properties shown in the following table.

| | |
|---|---|
| Overall thickness of protective film | 65 μm |
| Bond strength to steel at room temperature, 1/2 h after bonding, with a peel angle of 180° and a peel rate of 300 mm/min | 0.3 N/cm |
| Bond strength to 2K PU paint at room temperature, 1/2 h after bonding, with a peel angle of 180° and a peel rate of 300 mm/min | 0.5 N/cm |
| Bond strength to 2K PU paint at room temperature, 3 d after bonding, with a peel angle of 180° and a peel rate of 300 mm/min | 1.1 N/cm |
| Bond strength to 2K PU paint at room temperature, after 3 d at 90° C, with a peel angle of 180° and a peel rate of 300 mm/min | 1.9 N/cm |
| Bond strength to 2K PU paint at room temperature, after 3 d at 90° C., with a peel angle of 180° and a peel rate of 20 m/min | 2.3 N/cm |
| Bond strength to 2K PU paint at room temperature, after 14 d of alternating conditions (cycle 2 as indicated below), with a peel angle of 180° and a peel rate of 300 mm/min | 2.8 N/cm |
| Bond strength on the reverse face, with a peel angle of 180° and a peel rate of 300 mm/min | 0.1 N/cm |

The alternating conditions comprise the following cycles:

| Cycle 1 | | Cycle 2 | |
|---|---|---|---|
| Duration [h] | Temperature [° C.] | Duration [d] | Temperature [° C.] |
| 4 | 80 | 3 | 90 |
| 4 | −30 | plus 4 times cycle 1 | |
| 16 | 40 at 100% rel. humidity | | |

Cycle 2 is repeated a total of two times.

The protective film was bonded to freshly painted metal panels (2K PU paint) and removed after one week. In the edge region, no paint deformations were perceptible while, under oblique light a slight loss of brightness was observed over the area. When samples bonded to paint were subjected to UV aging (800 h Xenotest 150 in accordance with DIN 53387 1-A-X), no residues of adhesive occurred following removal.

Example 2

A 50 μm polyolefin film was produced as in example 1, the film being composed of 80 parts by weight PP random copolymer with 5.5% ethylene (Novolen 3300 MC, BASF), 10 parts by weight LLDPE, 7 parts by weight titanium dioxide and 0.45 part by weight HALS light stabilizer (Chimassorb 944, Ciba). The film showed a force of 14 N/15 mm at 10% elongation in the longitudinal direction. The film was corona pretreated and immediately thereafter was coated with a degassed two-component, solvent-free polyurethane pressure-sensitive adhesive composition in a thickness of 20 μm using a coating bar, as in example 1.

The composition of the polyurethane pressure-sensitive adhesive was as follows:

|  | Base material | Weight fraction [% by weight] |
|---|---|---|
| A component | Arcol 1030 ® | 2.6 |
|  | Arcol 1042 ® | 86.8 |
|  | Dibutyltin dilaurate | 0.4 |
|  | Tinuvin 400 ® | 0.4 |
|  | Tinuvin 292 ® | 0.2 |
|  | Aerosil R202 ® | 1.2 |
| B component | Vestanat IPDI ® | 8.4 |

The loss angle tan δ of the PSA film at room temperature with a measuring frequency of $10^{-1}$ rad/s had a value of 0.01 which rose to 0.12 with a measuring frequency of $10^2$ rad/s.

The bond strength to 2K PU paint ½ h after bonding was 0.3 N/cm, after 3 d/90° C. at 300 mm/min peel rate 1.7 N/cm, after 3 d/90° C. at 20 m/min peel rate 2.0 N/cm, and after 14 d of alternating climatic conditions 2.4 N/cm (all measurement parameters in analogy to example 1). The protective film was bonded to freshly painted metal panels (2K PU paint) and removed after one week. Paint deformations were perceptible neither in the edge region nor over the area. When specimens bonded to paint were exposed to 800 h of Xenotest 150, no residues of adhesive composition occurred following removal.

Example 3

A 50 µm polyolefin film whose composition and manufacture were similar to those in example 1 was coated analogously, following corona pretreatment, with a degassed, two-component, solvent-free polyurethane pressure-sensitive adhesive composition in a thickness of 20 µm.

The composition of the polyurethane pressure-sensitive adhesive was as follows:

|  | Base material | Weight fraction [% by weight] |
|---|---|---|
| A component | Arcol 1030 ® | 5.5 |
|  | Arcol 1042 ® | 62.8 |
|  | Dibutyltin dilaurate | 0.4 |
|  | Tinuvin 400 ® | 0.8 |
|  | Tinuvin 292 ® | 0.4 |
|  | Palatinol N ® | 20.9 |
| B component | Vestanat IPDI ® | 9.2 |

The loss angle tan δ of the PSA film at room temperature with a measuring frequency of $10^{-1}$ rad/s had a value of 0.01 which rose to 0.08 with a measuring frequency of $10^2$ rad/s.

The bond strength to 2K PU paint ½ h after bonding was 0.5 N/cm, after 3 d/90° C. at 300 mm/min peel rate 2.3 N/cm, after 3 d/90° C. at 20 m/min peel rate 2.9 N/cm, and after 14 d of alternating climatic conditions 4.1 N/cm (all measurement parameters in analogy to example 1). The protective film was bonded to freshly painted metal panels (2K PU paint) and removed after one week. Only in the edge region were very slight deformations perceptible; over the area it was not possible to find any paint deformations. When specimens bonded to paint were exposed to 800 h of Xenotest 150, no residues of adhesive composition occurred following removal.

Example 4

A 65 µm polyolefin film was produced as in example 2, the film being composed of a 50 µm base layer with a composition analogous to that in example 2 and of a 15 µm adhesion promoter layer comprising 20 parts by weight of the PP random copolymer and 80 parts by weight of LLDPE. The film showed a force of 18 N/15 mm at 10% elongation in the longitudinal direction.

The film was coated as in example 1, following corona pretreatment, with a degassed, two-component, solvent-free polyurethane pressure-sensitive adhesive composition in a thickness of 15 µm.

The composition of the polyurethane pressure-sensitive adhesive was as follows:

|  | Base material | Weight fraction [% by weight] |
|---|---|---|
| A component | Arcol 1030 ® | 5.5 |
|  | Arcol P1042 ® | 62.8 |
|  | Dibutyltin dilaurate | 0.4 |
|  | Tinuvin 400 ® | 0.8 |
|  | Tinuvin 292 ® | 0.4 |
|  | Centroplast FU 290 ® | 20.9 |
| B component | Vestanat IPDI ® | 9.2 |

The loss angle tan δ of the PSA film at room temperature with a measuring frequency of $10^{-1}$ rad/s had a value of 0.06 which rose to 0.25 with a measuring frequency of $10^2$ rad/s.

The bond strength to 2K PU paint ½ h after bonding was 0.8 N/cm, after 3 d/90° C. at 300 mm/min peel rate 2.1 N/cm, after 3 d/90° C. at 20 m/min peel rate 2.9 N/cm, and after 14 d of alternating climatic conditions 3.5 N/cm (all measurement parameters in analogy to example 1). The protective film was bonded to freshly painted metal panels (2K PU paint) and removed after one week. Both in the edge region and over the area, very slight deformations were perceptible. When specimens bonded to paint were exposed to 800 h of Xenotest 150, no residues of adhesive composition occurred following removal.

Example 5

A 50 µm polyolefin film whose composition and manufacture were similar to those in example 1 was coated analogously thereto, following corona pretreatment, with a degassed, two-component, solvent-free, polyurethane pressure-sensitive adhesive composition in a thickness of 20 µm.

The composition of the polyurethane pressure-sensitive adhesive was as follows:

|  | Base material | Weight fraction [% by weight] |
|---|---|---|
| A component | Epol ® | 89.5 |
|  | Dibutyltin dilaurate | 0.1 |
|  | Tinuvin 400 ® | 1.0 |
|  | Tinuvin 292 ® | 0.5 |
| B component | Vestanat IPDI ® | 8.9 |

The loss angle tan δ of the PSA film at room temperature with a measuring frequency of $10^{-1}$ rad/s had a value of 0.15 which rose to 0.22 with a measuring frequency of $10^2$ rad/s.

The bond strength to 2K PU paint ½ h after bonding was 0.2 N/cm, after 3 d/90° C. at 300 mm/min peel rate 1.3

N/cm, after 3 d/90° C. at 20 m/min peel rate 2.0 N/cm, and after 14 d of alternating climatic conditions 2.1 N/cm (all measurement parameters in analogy to example 1). The protective film was bonded to freshly painted metal panels (2K PU paint) and removed after one week. Paint deformations were perceptible neither in the edge region nor over the area. When specimens bonded to paint were exposed to 800 h of Xenotest 150, no residues of adhesive composition occurred following removal.

Example 6

A 50 μm polyolefin film whose composition and manufacture were similar to those in example 1 was coated analogously thereto, following corona pretreatment, with a degassed, two-component, solvent-free polyurethane pressure-sensitive adhesive composition in a thickness of 20 μm.

The composition of the polyurethane pressure-sensitive adhesive was as follows:

|  | Base material | Weight fraction [% by weight] |
| --- | --- | --- |
| A component | Epol ® | 70.4 |
|  | Centroplast FU 290 ® | 19.8 |
|  | Dibutyltin dilaurate | 0.2 |
|  | Tinuvin 400 ® | 1.4 |
|  | Tinuvin 292 ® | 0.7 |
| B component | Vestanat IPDI ® | 7.5 |

The loss angle tan δ of the PSA film at room temperature with a measuring frequency of $10^{-1}$ rad/s had a value of 0.25 which rose to 0.35 with a measuring frequency of $10^2$ rad/s.

The bond strength to 2K PU paint ½ h after bonding was 1.2 N/cm, after 3 d/90° C. at 300 mm/min peel rate 1.8 N/cm, after 3 d/90° C. at 20 m/min peel rate 2.9 N/cm, and after 14 d of alternating climatic conditions 4.1 N/cm (all measurement parameters in analogy to example 1). The protective film was bonded to freshly painted metal panels (2K PU paint) and removed after one week. Paint deformations were perceptible to a slight extent in the edge region and not at all over the area. When specimens bonded to paint were exposed to 800 h of Xenotest 150, no residues of adhesive composition occurred following removal.

Comparative Examples

Comparative Example 1

A 50 μm polyolefin film whose composition and manufacture were analogous to those in example 1 was coated in a thickness of 20 μm with a pressure-sensitive adhesive composition.

The adhesive composition used was a copolymer consisting of 80 mol % ethylene and 20 mol % 1-butene. Hot toluene was used as solvent. The bond strength to the paint was 0.2 N/cm (fresh) or 4.9 N/cm (following storage under alternating climatic conditions). The protective film tore on removal from the painted metal panel when one corner of an extensive bond was pulled. A protective film in accordance with this example showed severe paint deformations.

Comparative Example 2

As comparative example 1, but the copolymer consisted of 90 mol % ethylene and 10 mol % 1-butene. Hot toluene was needed as solvent. The bond strength to painted metal and to steel was less than 0.1 N/cm.

Comparative Example 3

As example 1, but with a copolymer of 70 mol % vinyl acetate and 30 mol % ethylene having a Mooney viscosity ML (1+4) 100° C. of 24. The bond strength to steel was 1.0 N/cm and to paint was 0.9 N/cm (fresh) or 3.6 N/cm (following storage under alternating climatic conditions). When the film was bonded to fresh paint, severe deformations were observed in the edge region and over the area.

Comparative Example 4

Similar to example 1, using as adhesive a mixture of polyisobutylenes: 25 parts by weight had a molecular weight $M_w$ of 1.2 million, 75 parts by weight had a $M_W$ of 35 thousand. The bond strength to paint was 0.6 N/cm (fresh) or 1.8 N/cm (following storage under alternating climatic conditions). When specimens bonded to paint were exposed to 800 h of Xenotest 150, slight residues of adhesive composition were perceptible over the area, and very severe residues of adhesive in the edge region, following removal. When the film was bonded to fresh paint, no paint deformations were perceptible.

Comparative Example 5

A 50 μm polyolefin film whose composition and manufacture were similar to those in example 1 was coated analogously thereto, following corona pretreatment, with a degassed, two-component, solvent-free polyurethane pressure-sensitive adhesive composition in a thickness of 20 μm.

The composition of the polyurethane pressure-sensitive adhesive was as follows:

|  | Base material | Weight fraction [% by weight] |
| --- | --- | --- |
| A component | Arcol 1074 ® | 40.6 |
|  | 2-methyl-1,3-propanediol | 16.3 |
|  | Dibutyltin dilaurate | 0.1 |
|  | Tinuvin 400 ® | 0.9 |
|  | Tinuvin 292 ® | 0.4 |
|  | Aerosil R202 ® | 1.7 |
| B component | Vestanat IPDI ® | 40.0 |

The loss angle tan δ of the PSA film at room temperature with a measuring frequency of $10^{-1}$ rad/s had a value of 1.0 which fell to 0.45 with a measuring frequency of $10^2$ rad/s.

The bond strength for 2K PU paint ½ h after bonding was 0.02 N/cm, after 3 d/90° C. at 300 mm/min peel rate 0.05 N/cm, after 3 d/90° C. at 20 m/min peel rate 0.09 N/cm, and after 14 d of alternating climatic conditions 1.2 N/cm (all measurement parameters in analogy to example 1). The protective film was bonded to freshly painted metal panels (2K PU paint) and removed after one week. Slight paint deformations were perceptible in the edge region and over the area. When specimens bonded to paint were exposed to 800 h of Xenotest 150, no residues of adhesive composition occurred following removal.

The invention claimed is:

1. A method of protecting a painted surface of an automobile or an automobile part from damage during assembly or transit, said method comprising applying to said painted surface a self-adhesive protective film comprising a backing layer and a self-adhesive layer comprising a crosslinked polyurethane, wherein the loss angle tan δ of the polyurethane at room temperature in the frequency interval from $10^{-1}$ to $10^2$ rad/sec rises or remains at the same level.

2. The method according to claim 1, wherein the backing layer comprises a thermoplastic polyolefin sheet which is unoriented.

3. The method according to claim 1, wherein the backing layer comprises at least one polyolefin from the group of the polyethylenes and/or the group of the polypropylenes.

4. The method according to claim 1, wherein the backing layer comprises at least one light stabilizer and/or one UV stabilizer.

5. The method according to claim 1, wherein the UV permeability of the surface protective film in the wavelength range from 290 to 360 nm is less than 1%.

6. The method according to claim 1, wherein the thickness of the backing layer is between 20 and 80 μm.

7. The method according to claim 1, wherein aliphatic isocyanates are used in forming the polyurethane of the self-adhesive composition.

8. The method according to claim 1, wherein the polyurethane of the self-adhesive composition is formed using as polyol component polypropylene glycols, polyethylene glycols, hydrogenated hydroxyl-functionalized polyisoprenes, hydroxyl-functionalized polyisobutylenes or hydroxyl-functionalized polyolefins.

9. The method according to claim 1, wherein fillers, pigments, rheological additives, additives for improving the adhesion, plasticizers, resins (tackifiers), elastomers, aging inhibitors (antioxidants), light stabilizers, UV absorbers, and/or other auxiliaries and additives are added to the self-adhesive composition.

10. The method according to claim 4, wherein the backing layer comprises the at least one light stabilizer and/or one UV stabilizer in an amount of at least 0.15% by weight.

11. The method according to claim 4, which comprises an adhesion promoter layer arranged between the backing layer and the adhesive layer.

* * * * *